(12) United States Patent
Khoshnevisan et al.

(10) Patent No.: US 11,096,191 B2
(45) Date of Patent: Aug. 17, 2021

(54) UE-CENTRIC CLUSTERING AND EFFICIENT SCHEDULING FOR COMP

(71) Applicant: QUALCOMM Incorporated, San Diego, CA (US)

(72) Inventors: Mostafa Khoshnevisan, San Diego, CA (US); Peerapol Tinnakornsrisuphap, San Diego, CA (US); Farhad Meshkati, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/415,895

(22) Filed: May 17, 2019

(65) Prior Publication Data

US 2019/0357233 A1    Nov. 21, 2019

Related U.S. Application Data

(60) Provisional application No. 62/674,359, filed on May 21, 2018.

(51) Int. Cl.
*H04L 5/00* (2006.01)
*H04L 1/00* (2006.01)
(Continued)

(52) U.S. Cl.
CPC ......... *H04W 72/121* (2013.01); *H04L 1/0003* (2013.01); *H04L 1/1809* (2013.01);
(Continued)

(58) Field of Classification Search
None
See application file for complete search history.

(56) References Cited

U.S. PATENT DOCUMENTS 8,619,566 B2 * 12/2013 Szymanski ........... H04L 5/0037
370/230
9,326,152 B1 * 4/2016 Yiu ....................... H04L 5/0073
(Continued)

FOREIGN PATENT DOCUMENTS

WO    WO-2018009278 A1    1/2018

OTHER PUBLICATIONS

Changyin S., et al., "Virtual cell association and multi cell scheduling in Ultra-dense networks" 2017 IEEE International Conference on Signal Processing, Communications and Computing (ICSPCC), IEEE, Oct. 22, 2017 (Oct. 22, 2017), pp. 1-6, XP033291368, DOI: 10.1109/ICSPCC.2017.8242593, [retrieved on Dec. 29, 2017], p. 2, col. 1, line 7—p. 2, col. 1, line 23, p. 4, col. 2, line 5—p. 4, col. 2, line 26, p. 2, col. 1, line 8—p. 2, col. 1, line 44, p. 4, col. 1, line 26—p. 4, col. 1, line 37.

(Continued)

*Primary Examiner* — Edan Orgad
*Assistant Examiner* — Emmanuel K Maglo
(74) *Attorney, Agent, or Firm* — Patterson + Sheridan, LLP

(57) ABSTRACT

Certain aspects of the present disclosure provide techniques for user equipment (UE)-centric clustering and efficient scheduling for coordinated multipoint (CoMP). A method for UE-centric clustering and central scheduling includes determining a UE conflict graph. Vertices in the UE conflict graph are UEs for which there is a transmission and edges between vertices are UEs that have a scheduling conflict. The method includes transmitting signaling to schedule the UEs with resources for the transmission based on the UE conflict graph. A method for UE-centric clustering and cluster scheduling includes determining a cluster graph. Vertices in the cluster graph are CoMP clusters for one or more UEs for which there is a transmission and edges
(Continued)

between vertices are CoMP clusters that have a scheduling conflict. The method includes transmitting signaling to assign resources to the CoMP clusters based on the cluster graph.

26 Claims, 11 Drawing Sheets

(51) Int. Cl.
H04W 72/12 (2009.01)
H04L 1/18 (2006.01)
(52) U.S. Cl.
CPC ....... H04L 5/0035 (2013.01); H04W 72/1226 (2013.01); H04W 72/1263 (2013.01)

(56) References Cited

U.S. PATENT DOCUMENTS

| | | | |
|---|---|---|---|
| 2005/0075104 A1* | 4/2005 | Jain | H04W 16/14 455/423 |
| 2008/0279101 A1* | 11/2008 | Wu | H04L 45/123 370/235 |
| 2010/0080183 A1* | 4/2010 | Mishra | H04L 47/20 370/329 |
| 2011/0294527 A1* | 12/2011 | Brueck | H04W 36/00835 455/466 |
| 2012/0269510 A1* | 10/2012 | Hui | H04L 27/2697 398/50 |
| 2013/0315156 A1* | 11/2013 | Xiao | H04W 72/1263 370/329 |
| 2014/0003268 A1* | 1/2014 | Zarifi | H04W 72/121 370/252 |
| 2014/0023005 A1* | 1/2014 | Sundaresan | H04W 4/00 370/329 |
| 2014/0106802 A1* | 4/2014 | Cheng | H04W 72/12 455/509 |
| 2015/0004994 A1* | 1/2015 | Hwang | H04L 5/0032 455/452.1 |
| 2016/0050613 A1* | 2/2016 | Zhang | H04W 72/1242 370/336 |
| 2016/0226735 A1* | 8/2016 | Tulino | H04L 67/06 |
| 2016/0233994 A1* | 8/2016 | Prasad | H04L 5/0064 |
| 2017/0289984 A1* | 10/2017 | Baligh | H04L 27/2601 |
| 2018/0020470 A1* | 1/2018 | Zhuang | H04W 72/0446 |
| 2018/0068049 A1* | 3/2018 | Tsai | G03F 1/36 |
| 2018/0199212 A1* | 7/2018 | Lin | H04B 7/005 |
| 2018/0219656 A1* | 8/2018 | Lee | H04W 72/085 |
| 2018/0234996 A1* | 8/2018 | Khoury | H04W 72/1263 |
| 2018/0242325 A1* | 8/2018 | Guo | H04W 28/16 |

OTHER PUBLICATIONS

International Search Report and Written Opinion—PCT/US2019/033044—ISA/EPO—dated Jul. 29, 2019.

* cited by examiner

700A

| UE | Min _ RBs needed |
|---|---|
| UE 202 | 3 |
| UE 204 | 1 |
| UE 206 | 2 |
| UE 208 | 2 |
| UE 210 | 1 |

| RB | UEs |
|---|---|
| 1 | UE 202, UE 206, UE 210 |
| 2 | UE 202, UE 206 |
| 3 | UE 202, UE 208 |
| 4 | UE 204, UE 208 |

| RB | UEs |
|---|---|
| 1 | UE 202, UE 206, UE 210 |
| 2 | UE 202, UE 206, UE 210 |
| 3 | UE 202, UE 206, UE 210 |
| 4 | UE 204, UE 208 |
| 5 | UE 204, UE 208 |

FIG. 7C

UE-CENTRIC CLUSTERING AND EFFICIENT SCHEDULING FOR COMP

CROSS-REFERENCE TO RELATED APPLICATION(S)

This application claims benefit of and priority to U.S. Provisional Patent Application Ser. No. 62/674,359, filed May 21, 2018, herein incorporated by reference in its entirety as if fully set forth below and for all applicable purposes.

BACKGROUND

Field of the Disclosure

Aspects of the present disclosure relate to wireless communications, and more particularly, to techniques for efficient clustering and scheduling for coordinated multipoint (CoMP).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide techniques and apparatus for user equipment (UE)-centric clustering and efficient scheduling for coordinated multipoint (CoMP). Certain aspects provide a method for UE-centric clustering and central scheduling.

Certain aspects provide a method that may be performed by a scheduling device. The method generally includes determining a UE conflict graph. Vertices in the UE conflict graph correspond to UEs for which there is a transmission and edges between vertices in the UE conflict graph correspond to UEs that have a scheduling conflict. The method generally includes scheduling one or more UEs for the transmission based on the UE conflict graph.

In some aspects, determining the UE conflict graph includes determining the vertices by determining UEs for which there is data to be scheduled for at least one of: a downlink joint transmission to the UEs or an uplink transmission from the UEs for joint reception.

In some aspects, the scheduling device is a central entity. In some examples, scheduling the one or more of the UEs includes sending scheduling information to the one or more of the UEs and/or one or more transmission points (TPs) serving the one or more of the UEs.

In some aspects, determining the UE conflict graph includes determining one or more coordinated multipoint (CoMP) clusters to which the one or more of the UEs belong, each CoMP cluster including one or more TPs and determining that UEs have a scheduling conflict based on whether the CoMP clusters to which the UEs belong have at least one common TP and/or whether the TPs in at least one of the CoMP clusters to which one of the UEs belongs is configured to mute for interference management of one or more of the other UEs. In some examples, the scheduling device receiving backhaul information from one or more the TPs in the one or more CoMP clusters. In some examples, the determination of the UE conflict graph is based on the backhaul information.

In some aspects, the one or more CoMP clusters are UE-centric CoMP clusters, each UE-centric CoMP cluster including one or more TPs having a strongest signal quality with respect to the UEs served by the TPs. In some examples, each UE-centric CoMP cluster includes TPs having a signal quality, with respect to the UEs served by the TPs, that is above a threshold. In some examples, the threshold is a first threshold for an initial transmission and a second threshold for a retransmission. In some examples, the second threshold is lower than the first threshold.

In some aspects, scheduling the one or more of the UEs for transmission based on the UE conflict graph includes scheduling a set of UEs for simultaneous transmission in a same resource block (RB) only when the set of UEs is an independent set of UEs, the independent set of UEs including only UEs that do not have an edge between them in the UE conflict graph. In some examples, the independent set of UEs is scheduled further only when the set of UEs is not a subset of another independent set of UEs in the UE conflict graph.

In some aspects, the scheduling device determines an ordering of the UEs in the UE conflict graph and determines a set of RBs available for scheduling.

In some aspects, the ordering is based on an associated delay budget of the transmission for the UE. In some examples, scheduling the one or more of the UEs for transmission based on the UE conflict graph includes, for each of the RBs available for scheduling, maintaining a list of the UEs that can be assigned the RB; and iteratively performing in descending order: determining a modulation and coding scheme (MCS) and a number of RBs for a first UE in the ordering; assigning the number of RBs for the first UE from the RBs including the first UE in the list for the RB; and for each of the assigned RBs, removing the first UE and all UEs having an edge in the UE conflict graph with the first UE from the list of the UEs that can be assigned the RB.

In some aspects, scheduling the one or more of the UEs for transmission based on the UE conflict graph includes determining a maximum independent set (MIS) of UEs by iteratively performing, until no UEs remain in the ordering: selecting a next UE in the ordering to schedule for transmission, and excluding from the ordering all UEs having an edge in the UE conflict graph with the selected UE; and scheduling the MIS of UEs for simultaneous downlink transmission on the same RBs. In some examples, scheduling the MIS of UEs for simultaneous downlink transmission on the same RBs includes determining a MCS and a number of RBs for each of the UEs in the MIS of UEs; determining a maximum of the determined number of RBs; and allocating the determined maximum number of RBs to each of the UEs in the MIS of UEs. In some examples, the scheduling device updates the MCS for the UEs in the MIS of UEs based on the allocated maximum number of RBs. In some examples, the scheduling excludes the MIS of UEs from the ordering and excluding the allocated RBs from the available RBs; and iteratively performs, until all of the UEs are scheduled: determining another one or more MISs of UEs, scheduling the one or more other MISs of UEs, excluding the one or more MISs from the ordering, and excluding the allocated RBs from the available RBs.

Certain aspects provide a method that may be performed by a central entity. The method generally includes determining a cluster graph. Vertices in the cluster graph correspond to one or more CoMP clusters for one or more UEs for which there is a transmission and edges between vertices in the cluster graph correspond to CoMP clusters that have a scheduling conflict. Each CoMP cluster includes one or more TPs. The method generally includes assigning resources to one or more of the CoMP clusters based on the cluster graph.

In some aspects, determining the cluster graph includes determining the vertices by determining CoMP clusters for which there is data to be scheduled for a downlink joint transmission to one or more of the UEs and/or an uplink transmission from one or more of the UEs for joint reception.

In some aspects, assigning resources to the one or more of the CoMP clusters based on the cluster graph includes assigning orthogonal resources to CoMP clusters that have an edge between them in the cluster graph.

In some aspects, determining the cluster graph includes merging a first CoMP cluster for a first UE when the first CoMP cluster is a subset of a second CoMP cluster for a second UE; and including only a vertex corresponding to the merged CoMP cluster in the cluster graph.

In some aspects, determining the cluster graph includes determining CoMP clusters that have a scheduling conflict based on whether the CoMP clusters include at least one common TP and/or whether at least one of the TPs in the CoMP clusters is configured to perform muting for interference management of one or more UEs in another CoMP cluster.

In some aspects, the central entity receives backhaul information from one or more of the TPs in the one or more of the CoMP clusters. In some examples, the determination of the cluster graph is based on the backhaul information.

In some aspects, the CoMP clusters includes UE-centric CoMP clusters, each UE-centric CoMP cluster including TPs having a signal quality with respect to the UEs served by the TPs that satisfies a threshold.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7A is an example of the number of resource blocks (RBs) for scheduling the UEs in the example in FIG. 2, in accordance with certain aspects of the present disclosure.

FIG. 7B is an example assignment of the RBs for scheduling the UEs in the example in FIG. 7A, in accordance with certain aspects of the present disclosure.

FIG. 7C is another example assignment of the RBs for scheduling the UEs in the example in FIG. 7A, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for user equipment (UE)-centric clustering and efficient scheduling for coordinated multipoint (CoMP).

CoMP operations enable dynamic coordination of transmission and/or reception by multiple different transmission points (TPs), such as multiple base stations (BSs). CoMP may improve overall quality for the user, improve network utilization, provide enhanced reception performance, increase receive power, reduce interference, etc., enabling higher rates. CoMP operation may involve CoMP clusters of TPs that are involved in CoMP operations together. In some examples, CoMP clustering is static. However, static clustering may create cell-edge UEs at the boundary of the cluster. These cell-edge UEs may not benefit from CoMP operation. Some CoMP schemes involve user equipment (UE)-centric clustering. UE-centric clustering may be dynamic. With UE-centric clustering, for a given UE, the M strongest TPs may be added to the cluster for that UE. Thus, TPs may be added to and/or removed from the UE-centric cluster as conditions change.

UE-centric clustering can impose scheduling constraints and/or conflicts on the TPs. Accordingly, aspects of the present disclosure provide efficient scheduling techniques for UE-centric clustering schemes.

The following description provides examples of UE-centric clustering and efficient scheduling for CoMP, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Figure 1:
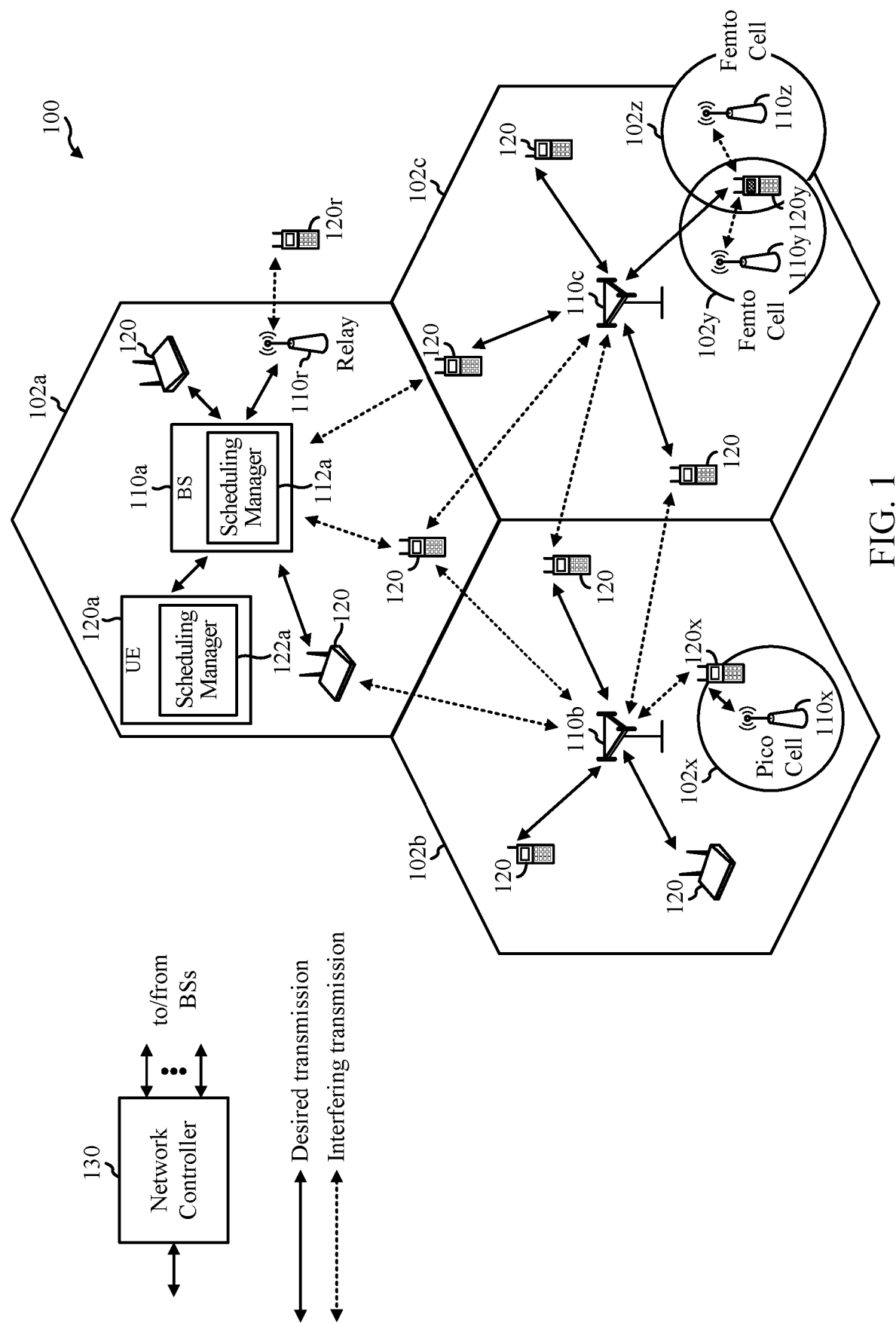
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be a new radio (e.g., 5G NR) network.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

A network entity, such as a BS 110a in the wireless communication network 100, determines a UE conflict graph or cluster graph in which vertices in the graph correspond to UEs 120 or CoMP clusters (e.g., one or more BSs 110) that have a scheduling conflict. The network entity schedules UEs 120 or assigns resources to the CoMP clusters based on the determined UE conflict graph or cluster graph. As shown in FIG. 1, the BS 110a includes a scheduling manager 112a. The scheduling manager 112a may be configured to determine the UE conflict graph or cluster graph, in accordance with certain aspects of the present disclosure. The scheduling manager 112a may be configured to schedule one or more UEs 120 based on the determined UE conflict graph or cluster graph, in accordance with certain aspects of the present disclosure. As shown in FIG. 1, the UE 120a includes a scheduling manager 122a. The scheduling manager 122a may be configured to receive scheduling from the BS 110a and to communicate within its CoMP cluster based on the scheduling, in accordance with certain aspects of the present disclosure Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120 to facilitate communication between devices.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

As discussed above, aspects of the present disclosure relate to clustering and efficient scheduling for CoMP operations. CoMP operations involve CoMP clusters of transmission points (TPs), such as transmission reception points (TRPs) or BSs involved in CoMP operations with one or more UEs. In some examples, CoMP operations may involve interference nulling, coordinated scheduling with muting, coordinated single-user (SU) beamforming, coordinated transmit diversity across multiple TPs, etc. As mentioned above, CoMP operations may provide advantages (e.g., improved overall quality for the user, network utilization, reception performance, and/or receive power, as well as reduced interference and/or enabling higher rates).

In some systems, CoMP clustering is static. For example, once the CoMP clusters are configured, the CoMP clusters do not change. Such static clustering may; however, create cell-edge UEs at the boundary of the cluster that do not benefit from the CoMP operations. For example, in the example network topography 200 illustrated in FIG. 2, if TP 212 and TP 214 form a CoMP cluster, and TRP 216 and TRP 218 form another CoMP cluster, then UE 206 may not benefit from CoMP operation, for example, because the UE 206 may be too far to be served by the TRP 212 and the TRP 218 and because the TRP 214 and the TRP 216 are in different CoMP clusters.

In some examples, CoMP operations may involve UE-centric clustering. With UE-centric clustering, the CoMP clusters may be dynamic. For example, the CoMP clusters can change over time. UE-centric clustering may help improve reliability. In UE-centric clustering, for a given UE, the M strong TPs may be added to the cluster of that UE. Thus, TPs can be added and/or removed from the cluster as conditions change. For example, a TP may be added to the cluster for that UE if the signal quality (e.g., path loss) satisfies a threshold. For example, a TP may be added to a UE-centric CoMP cluster if the TP has a signal quality, with respect to a given UE served by the cluster, that is within $\Delta x$ dB of the signal quality of the strongest TP in the cluster. The UE-centric cluster may be based on long term channel metrics, such as the path loss, reference signal received power (RSRP), etc. TPs can be added and/or removed from the UE-centric cluster as the long term channel metric changes.

In some scenarios; however, UE-centric clustering can impose scheduling constraints and/or conflicts on the TPs. For example, in the example network topology 200 shown in FIG. 2, in an example of UE-centric clustering the UE 202 may be served by the TRP 212; the UE 204 may be served by the TRP 212 and the TRP 214; the UE 206 may be served by the TRP 214 and the TRP 216; the UE 208 may be served by the TRP 216 and the TRP 218; and the UE 210 may be served by the TRP 218. Thus, when the UE 204 is scheduled by its cluster {TRP 212, TRP 214}, then UE 202 and UE 206 cannot be scheduled on the same RBs as the UE 204 because UE 202 and UE 206 share a TP with UE 204, i.e., the TRP 212 and the TRP 214, respectively. Thus, if no interference muting is performed, the UE 204 would have a scheduling conflict with the UE 202 and the UE 206. On the other hand, the UE 202, UE 206, and UE 210 have no scheduling conflict, and can all be scheduled on the same RBs by their CoMP clusters {TRP 212}, {TRP 214 and TRP 216}, and {TRP 218}, respectively.

Therefore, techniques for UE-centric clustering and scheduling for CoMP are desirable, that may avoid interference and maximize efficiency of scheduling resources.

Accordingly, aspects of the present disclosure provide efficient scheduling techniques for UE-centric clustering schemes.

Example UE-Centric Clustering And Efficient Scheduling For CoMP

According to certain aspects of the present disclosure, techniques are provided for efficient scheduling for coordinated multipoint (CoMP) operations that may use central scheduling and/or cluster scheduling for assigning resources and/or scheduling transmissions for transmission points (TPs) and or user equipment (UEs) in CoMP clusters, which may be UE-centric CoMP clusters.

In central scheduling, a central entity (e.g., a base station (BS), such as a BS 110 in the wireless communication network 100) may be responsible for resource assignment (e.g., resource block (RB) assignment) to UEs across multiple (e.g., all involved in the CoMP operations) TPs (e.g., BSs, transmission reception points (TRPs), etc.); however, the CoMP operations are still performed at the cluster level.

For central scheduling, backhaul information (e.g., via a low latency link) may be exchanged between all of the TPs involved in the CoMP operations. In some examples, backhaul information may be exchanged between the central entity and the TPs. For example, the TPs may provide information to the central entity in order for the central entity to make resource assignment determinations. In some examples, high capacity backhaul information may be exchanged between TPs within a CoMP cluster.

Figure 3:
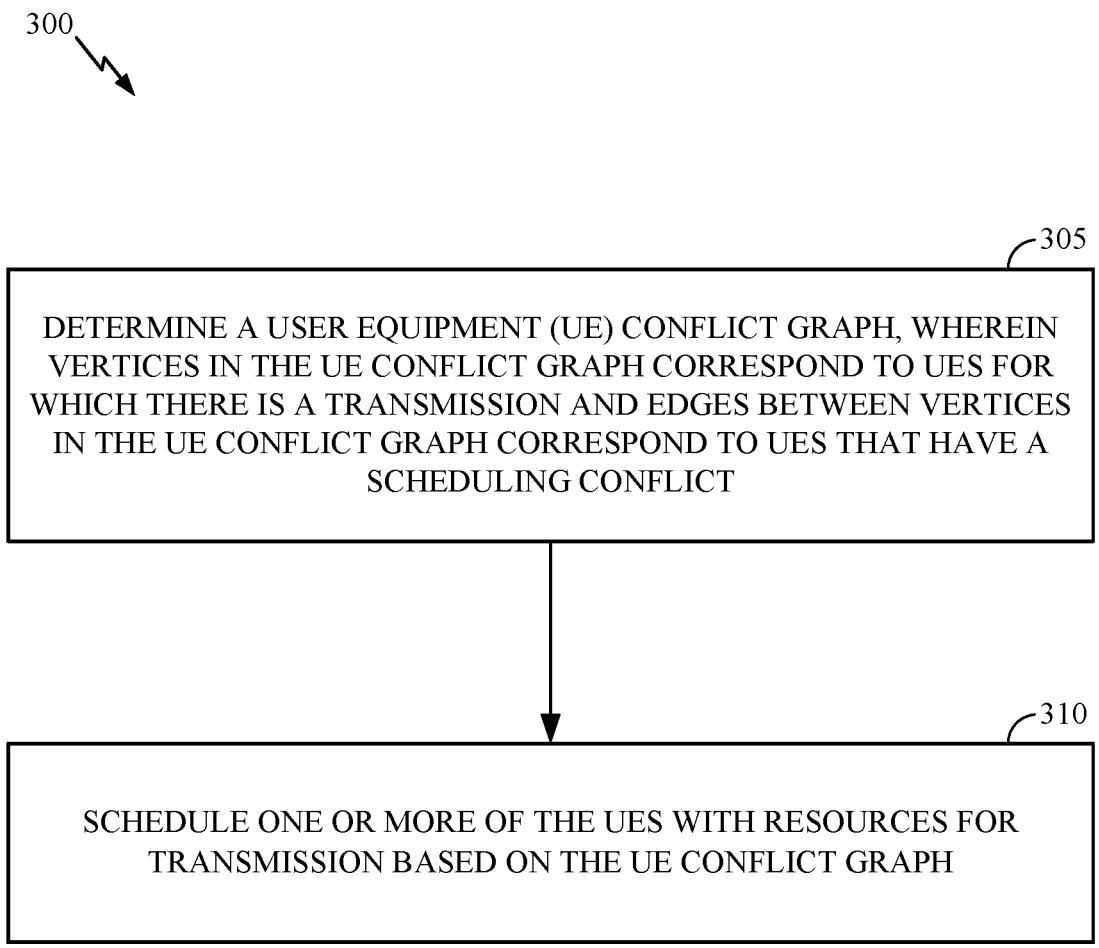
FIG. 3 is a flow diagram illustrating example operations for central scheduling of UE-centric CoMP clusters, in accordance with certain aspects of the present disclosure.

FIG. 3 is a flow diagram illustrating example operations 305 for central scheduling of UE-centric CoMP clusters, in accordance with certain aspects of the present disclosure. The operations 300 may be performed, for example, by a scheduling device (e.g., such as the BS 110a in the wireless communication network 100, a central entity, a central unit (CU), etc.). Operations 300 may be implemented as software components that are executed and run on one or more processors (e.g., controller/processor 1140 of FIG. 11). Further, the transmission and reception of signals by the scheduling entity in operations 300 may be enabled, for example, by one or more antennas (e.g., antennas 1134 of FIG. 11). In certain aspects, the transmission and/or reception of signals by the scheduling entity may be implemented via a bus interface of one or more processors (e.g., controller/processor 1140) obtaining and/or outputting signals.

Operations 300 may begin, at 305, by determining a UE conflict graph. Vertices in the UE conflict graph correspond to UEs (e.g., such as one or more UEs 120 in the wireless communication network 100) for which there is a transmission and edges between vertices in the UE conflict graph correspond to UEs that have a scheduling conflict.

In order to determine the vertices UE conflict graph, the scheduling device may determine for which UEs there is to be scheduled for transmission data (e.g., a packet to be jointly transmitted to the UE by its CoMP cluster and/or a packet to be transmitted by the UE and jointly received by its CoMP cluster). The scheduling device may determine the UEs for which there is data as the vertices in the UE conflict graph. In some examples, the scheduling entity may determine the CoMP clusters based on backhaul information received from TPs in the CoMP clusters.

In order to determine the edges in the UE conflict graph, the scheduling device may determine the CoMP clusters to which the UEs belong. The scheduling device may determine the edges in the UE conflict graph based on the CoMP clusters. For example, the scheduling device may determine that UEs have a scheduling conflict when the CoMP clusters to the UEs belong have at least one common TP. The scheduling device may determine the edges in the UE conflict graph as the UEs having a scheduling conflict. The scheduling device may determine that UEs that belong to CoMP clusters that do not have any common TPs do not have a scheduling conflict and, therefore, do not have an edge in the UE conflict graph. In some examples, however, the scheduling device may further determine that UEs have a scheduling conflict based on whether at least one TP in one of the CoMP clusters is configured to perform muting, for example, for interference management for a UE in a different CoMP cluster. In some examples, the scheduling device may receive backhaul information from one or more the TPs in the CoMP clusters and determine the UE conflict graph based on the collection of backhaul information. For example, the scheduling device may receive backhaul information regarding the CoMP cluster (e.g., which UEs are served by which TPs), regarding the UEs for which there is data to be scheduled, and/or regarding which TPs are configured to perform muting (e.g., and for which UEs the TPs are configured to perform the muting).

In some examples, the CoMP clusters are UE-centric CoMP clusters. For example, each UE-centric CoMP clusters may include one or more (e.g., M) strongest TPs, with respect the UE(s) served by the cluster. For example, the strongest TPs may be the TPs having a signal quality that satisfies a threshold. In some examples, a lower threshold may be used for retransmissions than for transmissions. In some examples, the TPs may be TPs having a signal quality relative to a signal quality of the strongest TP in the cluster.

At 310, the scheduling device schedules the UEs with resources for transmission (e.g., for transmission by the UE to the TPs in its CoMP cluster or for transmission to the UE by the TPs in the CoMP cluster) based on the UE conflict graph. In some examples, to schedule the UE with the resources the scheduling device sends scheduling information to the UEs. In some examples, to schedule the UE with the resources the scheduling device sends scheduling information to one or TPs serving the UEs, such as instructions or information regarding the UE conflict graph. In some examples, the scheduling device schedules a set of UEs for simultaneous transmission in a same RB and a same slot (e.g., or any set of overlapping time and frequency resources) only if the set of UEs is an independent set of UEs including only UEs that do not have an edge between them in the UE conflict graph. In some examples, the scheduling device schedules a set of UEs for simultaneous transmission in a same RB only if the set of UEs is a maximal independent set of UEs including an independent set of UEs that is not a subset of another independent set.

Figure 2:
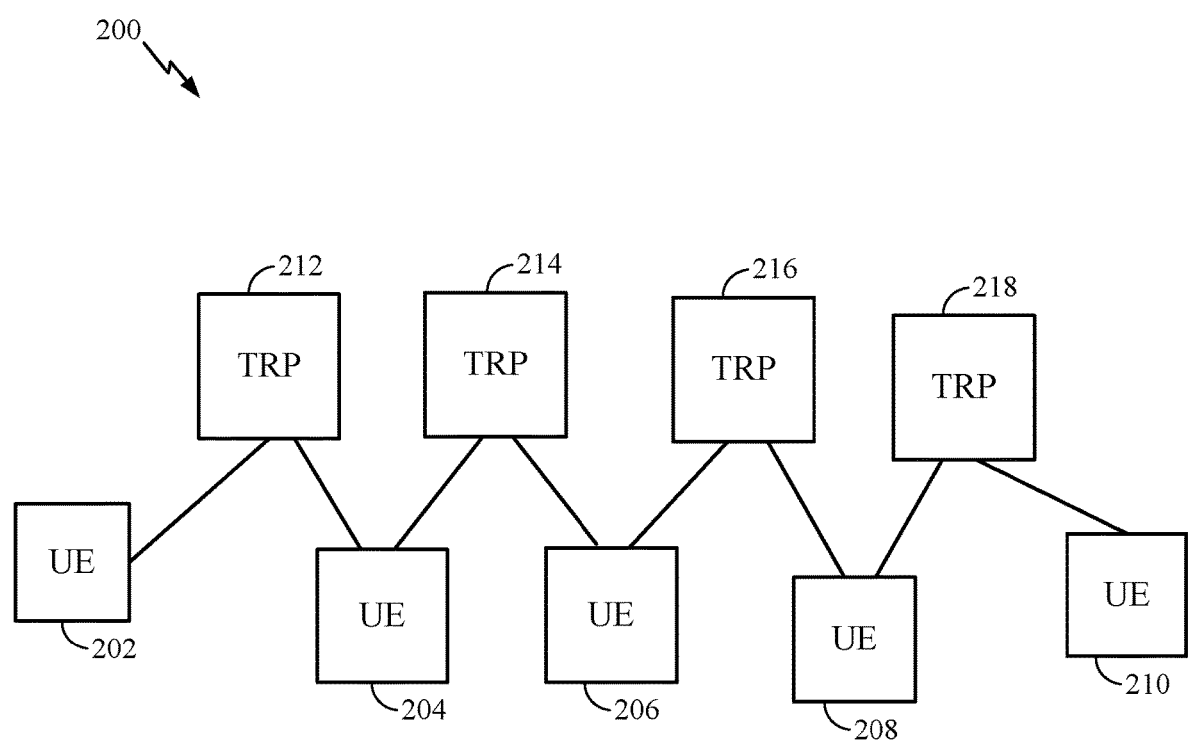
FIG. 2 is an example of UE-centric coordinated multi-point (CoMP) clusters, in accordance with certain aspects of the present disclosure.
Figure 4:
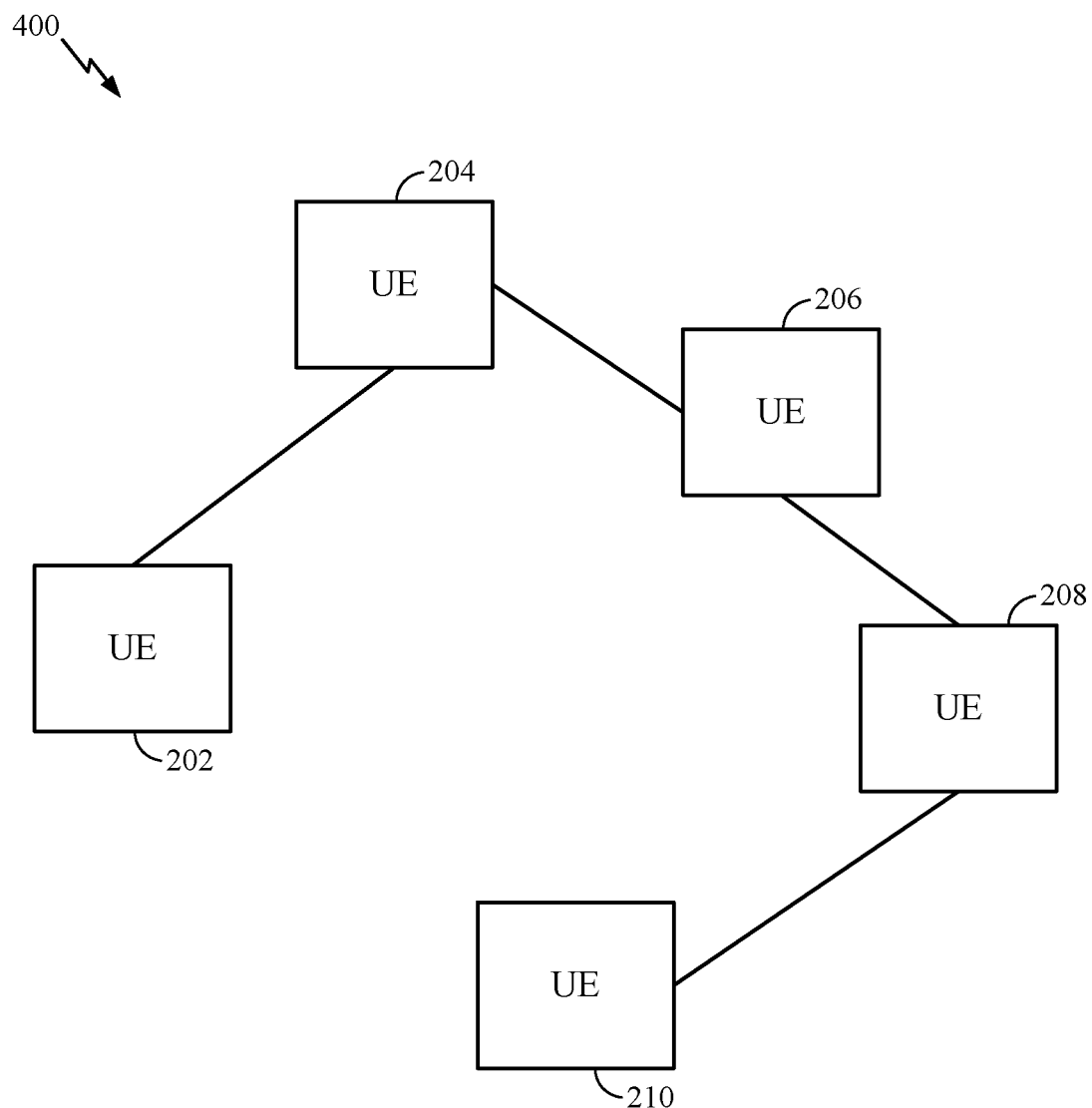
FIG. 4 is an example UE graph representing the UE-centric CoMP clusters in FIG. 2, in accordance with certain aspects of the present disclosure.

As mentioned above, at 305, the scheduling device determines a UE conflict graph. The UE conflict graph may be based on the network topology. FIG. 4 is an example UE conflict graph 400 based on the network topology 200 shown in FIG. 2. As shown in FIG. 4, the vertices in the UE conflict graph 400 correspond to the UEs (UEs 202, 204, . . . , 210) that have a packet to be scheduled for transmission (e.g., an initial/first transmission or a retransmission). The edges between UEs in the UE conflict graph 400 (i.e., shown as a connecting line) correspond a scheduling conflict between the UEs. In the case of no interference nulling, coordinated scheduling with muting, coordinated single-user (SU) beamforming, and coordinated transmit diversity across multiple TPs, etc., a conflict may occur whenever there is at least one common TP in the clusters of two UEs. FIG. 4 shows the UE cluster graph 400 for the example of the clusters for the UEs 202, 204, 206, 208, 210 in FIG. 2 formed as {TRP 212}, {TRP 212, TRP 214}, {TRP 214, TRP 216}, {TRP 216, TRP 218}, and {TRP 218}, respectively. As shown in FIG. 2, the UE 202 and UE 204, UE 204 and UE 206, UE 206 and UE 208, and UE 208 and UE 210, each share edges between them in the UE conflict graph 400 due to the common TRPs, whereas the UEs with clusters that not have any common TRP do have an edge in the UE conflict graph 400.

Figure 5:
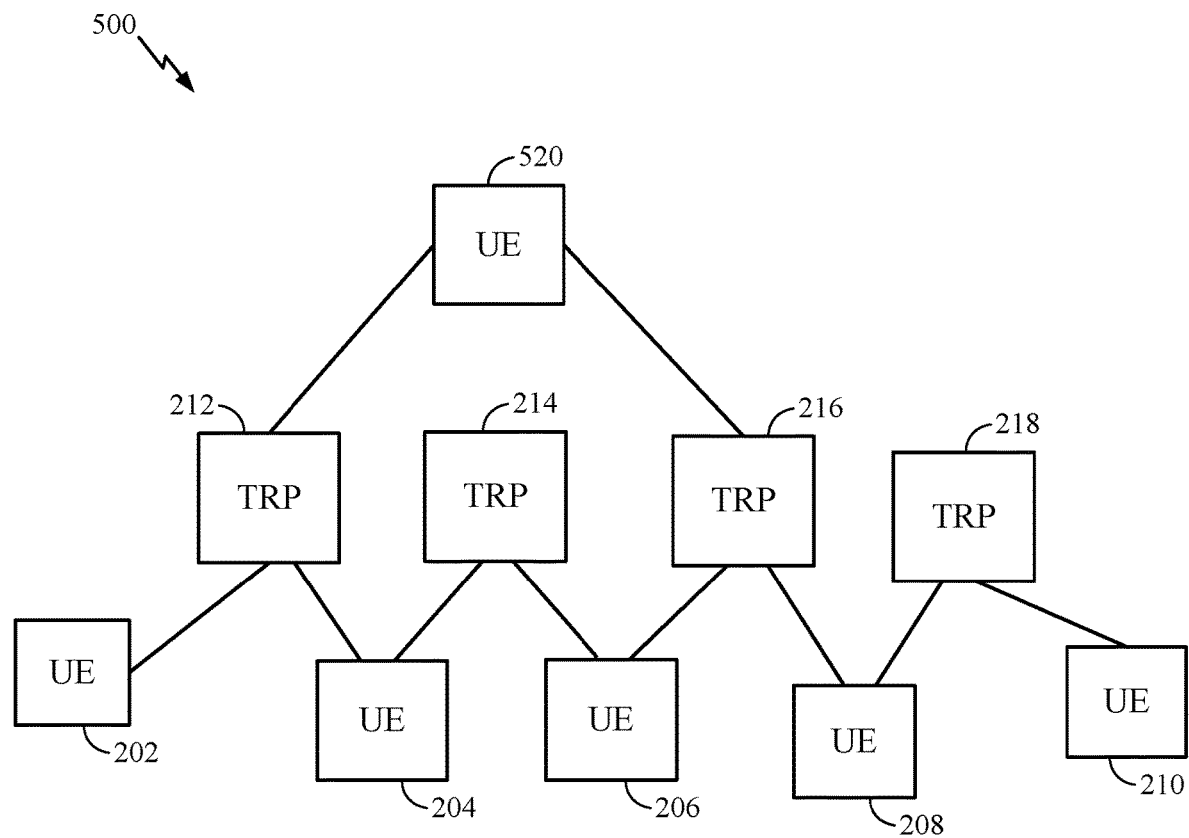
FIG. 5 is another example of UE-centric CoMP clusters, in accordance with certain aspects of the present disclosure.
Figure 6:
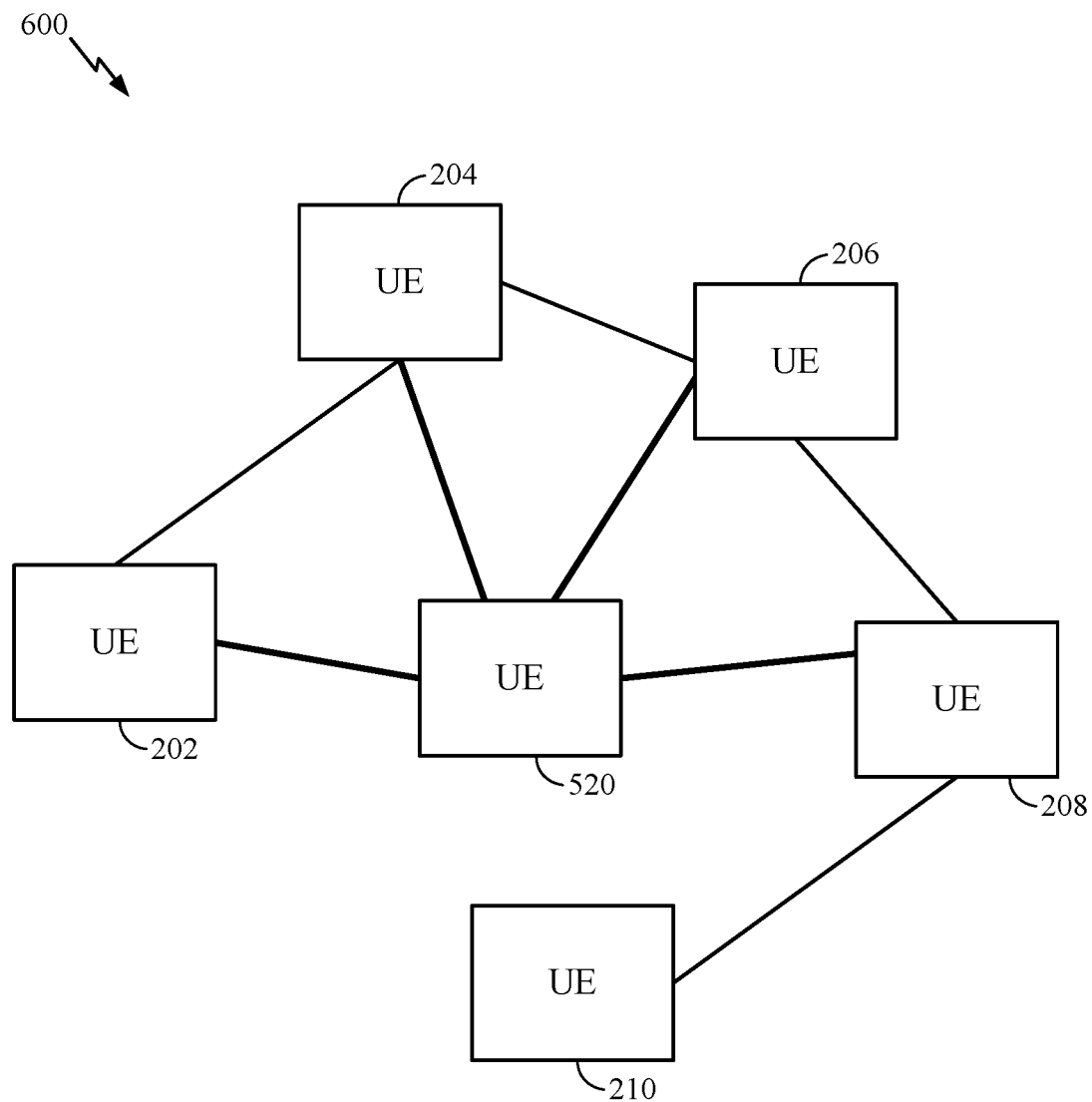
FIG. 6 is an example UE graph representing the UE-centric CoMP clusters in FIG. 5, in accordance with certain aspects of the present disclosure.

FIG. 5 and FIG. 6 illustrate another example of a network topology 500 with UE-centric clusters and a corresponding UE conflict graph 600, respectively. As shown in FIG. 5, the network topology 500 includes the clusters for the UEs 202, 204, 206, 208, 210 formed as {TRP 212}, {TRP 212, TRP 214}, {TRP 214, TRP 216}, {TRP 216, TRP 218}, and {TRP 218}, respectively (e.g., as in the network topology 200 in FIG. 2). The network topology 500 also includes the cluster {TRP 212, TRP 216} for the UE 520. Thus, the UE 520 has a scheduling conflict with the UE 202, UE 204, UE 206, and UE 208, and does not have a scheduling conflict with the UE 210, as shown in the UE conflict graph 600 in FIG. 6.

Based on the UE conflict graph, when scheduling the UEs at 310, the scheduling device may ensure that UEs with an edge between are not simultaneously scheduled in the same resources.

According to certain aspects, an independent set of UEs may be a set of UEs (or vertices from the UE conflict graph) that do not share any edges between them. A maximal independent set (MIS) may be defined as an independent set that is not a subset of any other independent set from the UE graph. For example, as shown in the UE conflict graph 400 in FIG. 4, the MISs are {UE 202, UE 206, UE 210}, {UE 204, UE 208}, {UE 202, UE 208}, and {UE 204, UE 210}; and as shown in the UE graph 600 in FIG. 6, the MISs also includes {UE 520, UE 210}. According to certain aspects, in a given RB, the scheduling device may schedule any of (e.g., all) the members of an MIS for simultaneous (or at least partially overlapping in time) transmission, and no other UEs can be scheduled in the RB beyond the members of a MIS (i.e., because they would conflict).

According to certain aspects, the scheduling device may use an efficient packing per-UE approach for scheduling UEs at 310. In some examples, the scheduling device maintains a potential list of UEs per RB (e.g., for each of a set of available RBs). Initially, the list contains all of the UEs having a packet for transmission. As an example, for the example network topology 200 in FIG. 2, the scheduling device includes UEs 202, 204, . . . , 2010 in the list for each of RBs 1-5. The scheduling device may sort the UEs in the list into an ordering. For example, the scheduling device may order the list of UEs according to their delay budget (e.g., a delay budget associated with the transmissions to be scheduled for the UEs). UEs that have a packet for retransmission may be first in the queue (e.g., for a higher priority, to ensure assigning of resources for the retransmissions first) before UEs with a first or initial transmission.

According to certain aspects, the scheduling device efficiently schedules the UEs according to a per-UE scheduling algorithm. As part of the scheduling algorithm, the scheduling device may find the modulation coding scheme (MCS) and number of RBs associated with the transmission to be scheduled for the next UE (e.g., the first UE or next remaining UE in the queue) in the queue (i.e., in the ordered list), UE. The table 700A in FIG. 7A illustrates an example number of RBs (num_RBs) associated with the transmissions to be scheduled for the UEs in the example network topology 200. For example, as shown in the table 700A, the UE 202 needs 3 RBs.

The scheduling device assigns the $UE_i$ the number RBs from among the RBs available for the UE (e.g., those RBs that include $UE_i$ in their potential list). Table 700B in FIG. 7B shows example RB assignment to the UEs 202, 204, . . . 210 according to the per-UE scheduling algorithm. As shown in table 700B, the scheduling device may assign RBs 1-3 for the UE 202.

Then, for each of the RBs assigned to $UE_i$, $UE_j$ and UEs connected to $UE_i$ in the UE conflict graph are excluded from the list of potential UEs for those RBs. In other words, the UE is excluded because it was already assigned with the RB and the UEs having a scheduling conflict with the UE are also excluded to prevent them from being assigned that RB. Referring back to the example in FIG. 7A and FIG. 7B, after the scheduling device assigns the RBs 1-3 to the UE 202, the scheduling device then removes the UE 202 as well as the UE 204 from the list of potential UEs for the RBs 1-3.

After assigning the RBs to the $UE_i$ and updating the list of available UEs for those RBs, the scheduling device moves the next UE in the ordered list $UE_{i+i}$ and repeats the above steps. For example, for the UE 204 needing 1 RB (as shown in table 700A), the scheduling device assigns the RB 4 because the UE 204 is excluded from the list for RBs 1-3. Then, the scheduling device updates the list for the RB 4 to exclude the UE 204 as well as the UEs 202 and 206 that have a scheduling conflict the UE 204 in the UE conflict graph 400, and then continues to assign the RBs for the UEs 206, 208, and 210 in the same manner until all of the UEs are scheduled (or until all of the RBs are scheduled).

Thus, once all of the UEs have been assigned their resources, each RB will include a MIS (unless the RBs are underutilized in which case smaller MCS can be chosen for better reliability, for example, iteratively choosing MCS and RB assignment is also possible).

According to certain aspects, the scheduling device can use a contiguous RB assignment per-MIS approach for efficiently scheduling the UEs. As part of the contiguous RB assignment per-MIS approach, the scheduling device may order the UEs as described above. To determine/form the MISs, the scheduling device includes the first available UE from the queue (e.g., the ordering of UEs) in a first MIS. The scheduling device then excludes the UEs in the UE conflict graph that have an edge to that UE (e.g., that have a scheduling conflict). Next, the scheduling device includes the next available (e.g., not excluded) UE from the ordering in the MIS and excludes in the UE conflict graph that have an edge to that UE. The scheduling device repeats the including and excluding until there are no other UEs available to be included in the MIS.

Once the scheduling device forms the MIS, the scheduling device determines the MCS and number of RBs for of the UEs in the MIS. The scheduling device finds the maximum number of RBs among the number of RBs of all the members of the MIS. For the example MISs {UE 202, UE 206, UE 210}, {UE 204, UE 208}, {UE 202, UE 208}, and {UE 204, UE 210} of the example network topology 200, using the example table 700A, the maximum number of RBs for the MIS {UE 202, UE 206, UE 210} is 3 RBs. The scheduling device then assigns the determined maximum number of RBs to all of the UEs in the MIS. As shown in the table 700C in FIG. 7C, the scheduling device assigns the RBs 1-3 to each of the UEs in the MIS {UE 202, UE 206, UE 210}. The scheduling device may update the MCS of the UEs in the MIS based on the assigned number of RBs. For example, scheduling device may update some of the UEs to use a smaller MCS for UEs needing a number of RBs that is smaller than the assigned maximum number of RBs of the MIS. The updated MCSs may enhance the reliability of the scheduled transmissions for those UEs.

The scheduling device then removes all of the UEs in the MIS from the ordering of UEs and removes the RBs assigned to the MIS from the available RBs. The scheduling device then repeats the process (e.g., starting with the next non-excluded UE in the ordering) to determine the next MIS and the RBs to assign to that MIS. The scheduling device can repeat this process until all of the UEs are formed in MISs and all of the MISs have been assigned resources.

Clustering may be different for transmissions (e.g., initial or first transmissions) and retransmissions. For example, in order to increase reliability for retransmissions, a larger cluster size (per UE) may be formed for retransmissions compared to the first transmission. As discussed above, for UE-centric clustering the M strongest TPs are added to the CoMP cluster for a UE. For example, a TP is added to the CoMP cluster for a UE when the signal quality is within Δx dB of the strongest TP in the cluster. In some examples, a different threshold can be used for transmissions than the threshold used for retransmissions and, therefore, each UE may have different clusters for transmissions and retransmissions. In some examples, in a given slot the cluster (M1, Δx) may be used for UEs with packet for first transmission and the cluster (M2, Δy) may be used for UEs with a retransmission.

As mentioned above, aspects of the present disclosure provide techniques for efficient scheduling for CoMP operations using cluster scheduling. In cluster scheduling, both the CoMP operations and the scheduling decisions may be performed within a CoMP cluster. Since the CoMP clusters may not interact dynamically, the low latency backhaul between clusters may not be needed/present. As will be described in more detail below, to ensure that conflicting scheduling decisions are not made among different clusters, orthogonal resources may be assigned among conflicting clusters.

Figure 8:
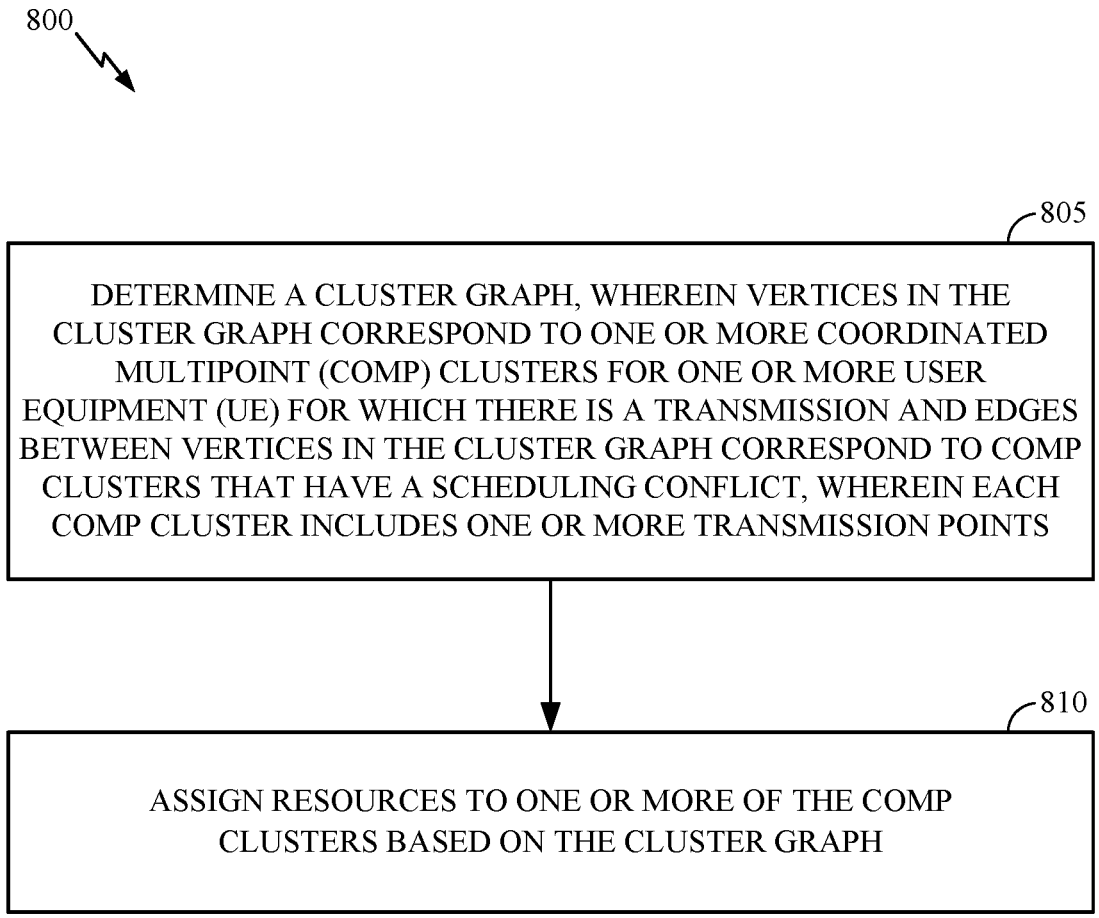
FIG. 8 is a flow diagram illustrating example operations for cluster scheduling of UE-centric CoMP clusters, in accordance with certain aspects of the present disclosure.

FIG. 8 is a flow diagram illustrating example operations 800 for cluster scheduling of UE-centric CoMP clusters, in accordance with certain aspects of the present disclosure. The operations 800 may be performed, for example, by a central entity (e.g., such as the BS 110a in the wireless communication network 100, a CU, etc.). Operations 800 may be implemented as software components that are executed and run on one or more processors (e.g., controller/processor 1140 of FIG. 11). Further, the transmission and reception of signals by the central entity in operations 800 may be enabled, for example, by one or more antennas (e.g., antennas 1134 of FIG. 11). In certain aspects, the transmission and/or reception of signals by the central entity may be implemented via a bus interface of one or more processors (e.g., controller/processor 1140) obtaining and/or outputting signals.

Operations 800 may begin, at 805, by determining a cluster graph. Vertices in the cluster graph correspond to CoMP clusters (e.g., UE-centric CoMP clusters) for UEs for which there is a transmission (e.g., a downlink joint transmission by the TPs in the CoMP cluster to the UE served by the cluster or an uplink transmission from a UE in the CoMP cluster for joint reception by the TPs in the UE's CoMP cluster). Edges between vertices in the cluster graph correspond to CoMP clusters that have a scheduling conflict.

Figure 9:
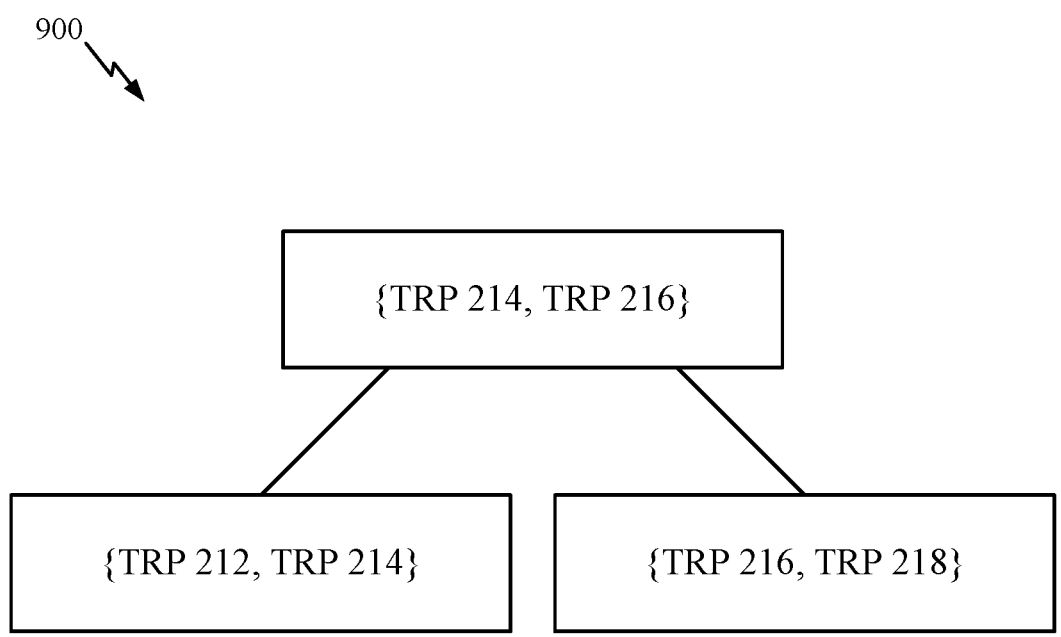
FIG. 9 is an example cluster graph representing the UE-centric CoMP clusters in FIG. 2, in accordance with certain aspects of the present disclosure.

According to certain aspects, the central entity may determine the CoMP cluster for each UE. In some examples, the CoMP clusters are based on long term channel stats (e.g., path loss, RSRP, etc.). For the example network topology 200 shown in FIG. 2, the CoMP cluster may be {TRP 212}, {TRP 212, TRP 214}, {TRP 214, TRP 216}, {TRP 216, TRP 218}, and {TRP 218}. In some examples, one or more of the vertices may correspond to merged CoMP clusters. For example, when a first CoMP cluster for a first UE is a subset of a second CoMP cluster for a second UE the first CoMP cluster may be merged into the second CoMP cluster FIG. 9 illustrates an example cluster graph 900 for the example network topology in FIG. 2. As shown in FIG. 9, for the example network topology 200, the merged clusters may be {TRP 212, TRP 214}, {TRP 214, TRP 216}, and {TRP 216, TRP 218}. Vertices in the cluster graph may correspond to the merged clusters.

The central entity may determine edges in the cluster graph by determining CoMP clusters that have a scheduling conflict. The central entity may determine CoMP clusters having a scheduling conflict based on whether the CoMP clusters include at least one common TP and/or whether the TPs in the CoMP clusters are configured to perform muting. The central entity may receive backhaul information from one or more the TPs in the one or more CoMP clusters and determine the cluster graph is based on the backhaul information. As shown in the cluster graph 900, for the example network topology 200 there is an edge between the CoMP clusters {TRP 212, TRP 214} and {TRP 214, TRP 216} due to the shared TRP 214, and between the CoMP clusters {TRP 214, TRP 216}, and {TRP 216, TRP 218} due to the shared TRP 216, whereas the CoMP clusters {TRP 212, TRP 214} and {TRP 216, TRP 218} do not have any common TRPs, do not have a scheduling conflict, and do not share an edge in the cluster graph 900.

At 810, the central entity assigns resources to the CoMP clusters based on the cluster graph. According to certain aspects, the central entity assigns orthogonal resources to CoMP clusters that have an edge between them in the cluster graph. For example, the central entity may divide the resources into parts, such as a first part for CoMP clusters that do not shared edge and another part for the CoMP clusters that share an edge with the first part. According to certain aspects, the different parts include orthogonal resources. The central entity may assign resources to the CoMP clusters from the associated part. For the example cluster graph 900, the central entity may CoMP clusters{ TRP 212, TRP 214} and {TRP 216, TRP 218} a first set of resources and assign the CoMP cluster {TRP 214, TRP 216} another set of resources that is orthogonal to the first set of resources.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Figure 10:
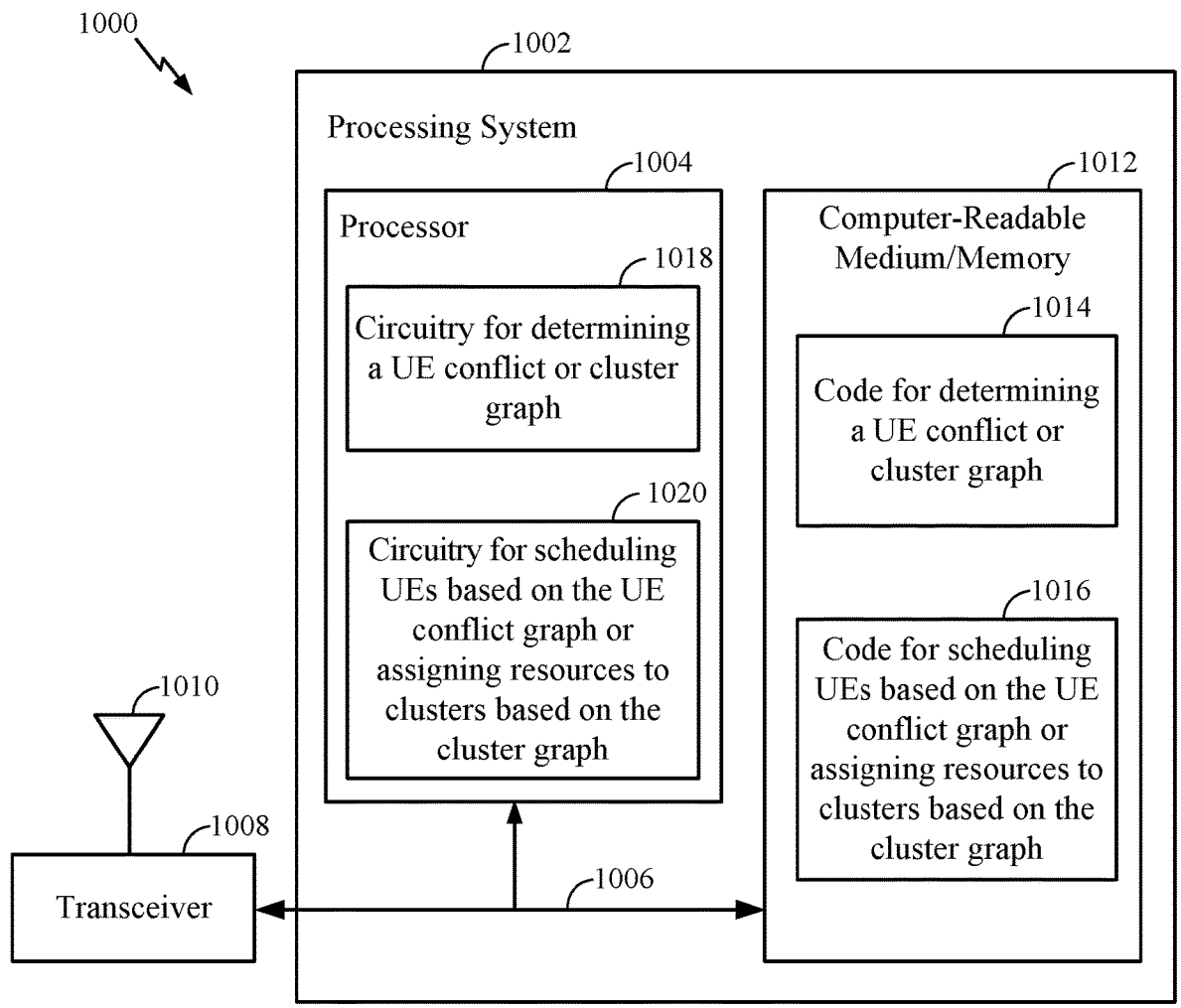
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 3 and/or FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1003 coupled to a computer-readable medium/memory 1012 via a bus 1006. In certain aspects, the computer-readable medium/memory 1012 is configured to store instructions (e.g., computer executable code) that when executed by the processor 1004, cause the processor 1004 to perform the operations illustrated in FIG. 3 and/or FIG. 8, or other operations for performing the various techniques discussed herein for UE-centric clustering and efficient scheduling. In certain aspects, computer-readable medium/memory 1012 stores code 1014 for determining a UE conflict graph and/or a cluster graph, in accordance with aspects of the present disclosure; and code 1016 for scheduling UEs based on the UE conflict graph and/or assigning resources to clusters based on the cluster graph, in accordance with aspects of the present disclosure. The processor 1004 includes circuitry 1018 for determining a UE conflict graph and/or a cluster graph; and circuitry 1020 for scheduling UEs based on the UE conflict graph and/or assigning resources to clusters based on the cluster graph.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 11:
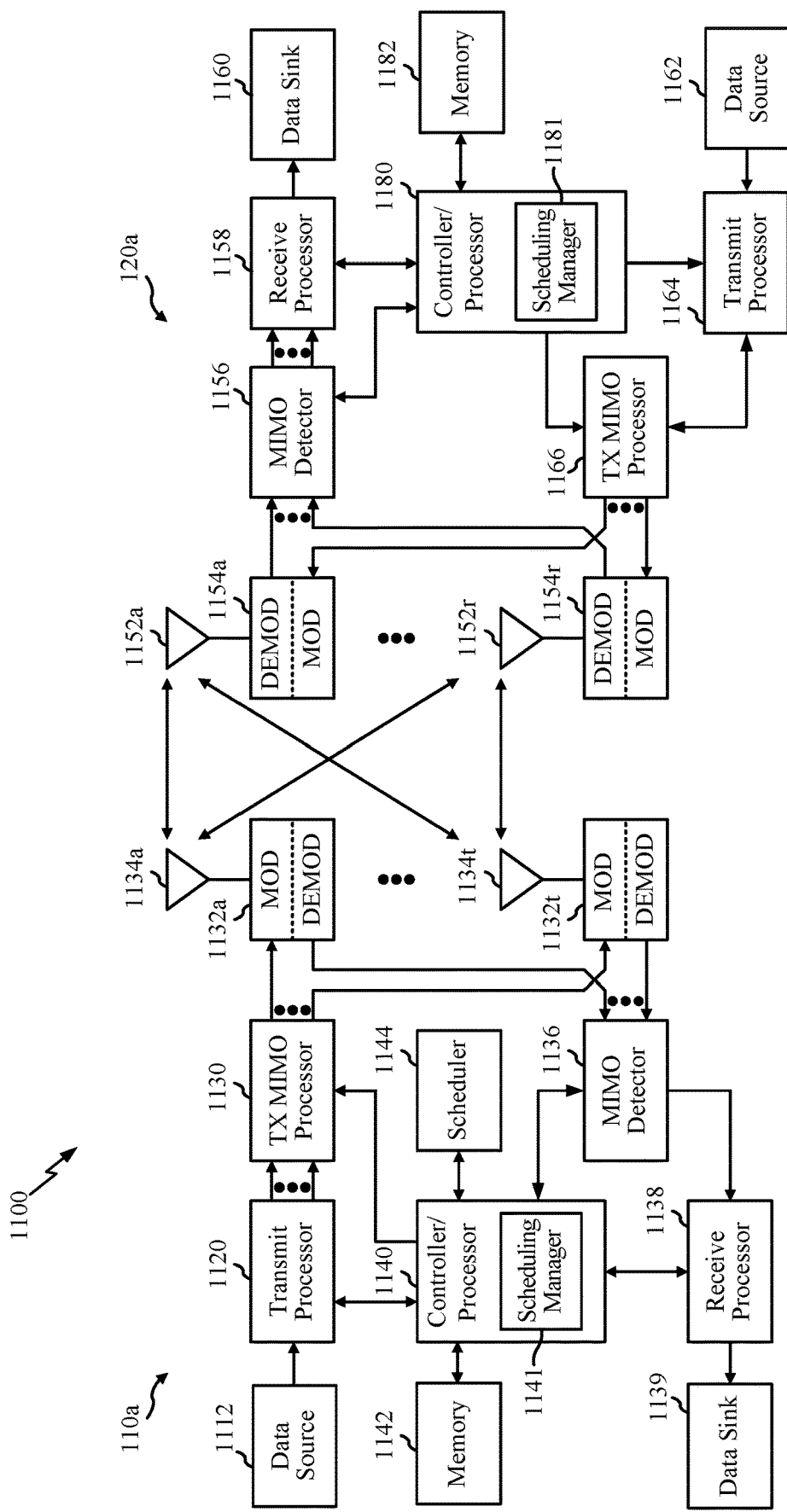
FIG. 11 is a block diagram conceptually illustrating a design of an example base station (BS) and UE, in accordance with certain aspects of the present disclosure.

FIG. 11 illustrates example components of a BS and a UE, such as the BS 110a and the UE 120a in the wireless communication network 100 of FIG. 1, which may be used to implement aspects of the present disclosure. For example, antennas 1152, processors 1166, 1158, 1164, and/or controller/processor 1180 of the UE 120*a* and/or antennas 1134, processors 1120, 1130, 1138, and/or controller/processor 1140 of the BS 110*a* may be used to perform the various techniques and methods described herein for UE-centric clustering and efficient scheduling for CoMP.

At the BS 110*a*, a transmit processor 1120 may receive data from a data source 1112 and control information from a controller/processor 1140. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the physical downlink shared channel (PDSCH), etc. The processor 1120 may process (e.g., encode and symbol map) the data and control information to obtain data symbols and control symbols, respectively. The transmit processor 1120 may also generate reference symbols, such as for the primary synchronization signal (PSS), secondary synchronization signal (SSS), and cell-specific reference signal (CRS). A transmit (TX) multiple-input multiple-output (MIMO) processor 1130 may perform spatial processing (e.g., precoding) on the data symbols, the control symbols, and/or the reference symbols, if applicable, and may provide output symbol streams to the modulators (MODs) 1132*a*-1132*t*. Each modulator 1132 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1132*a*-1132*t* may be transmitted via the antennas 1134*a*-1134*t*, respectively.

At the UE 120*a*, the antennas 1152*a*-1152*r* may receive the downlink signals from the BS 110*a* and may provide received signals to the demodulators (DEMODs) in transceivers 1154*a*-1154*r*, respectively. Each demodulator 1154 may condition (e.g., filter, amplify, downconvert, and digitize) a respective received signal to obtain input samples. Each demodulator may further process the input samples (e.g., for OFDM, etc.) to obtain received symbols. A MIMO detector 1156 may obtain received symbols from all the demodulators 1154*a*-1154*r*, perform MIMO detection on the received symbols if applicable, and provide detected symbols. A receive processor 1158 may process (e.g., demodulate, deinterleave, and decode) the detected symbols, provide decoded data for the UE 120*a* to a data sink 1160, and provide decoded control information to a controller/processor 1180.

On the uplink, at UE 120*a*, a transmit processor 1164 may receive and process data (e.g., for the physical uplink shared channel (PUSCH)) from a data source 1162 and control information (e.g., for the PUCCH) from the controller/processor 1180. The transmit processor 1164 may also generate reference symbols for a reference signal (e.g., for the SRS). The symbols from the transmit processor 1164 may be precoded by a TX MIMO processor 1166 if applicable, further processed by the demodulators in transceivers 1154*a*-1154*r* (e.g., for SC-FDM, etc.), and transmitted to the BS 110*a*. At the BS 110*a*, the uplink signals from the UE 120*a* may be received by the antennas 1134, processed by the modulators 1132, detected by a MIMO detector 1136 if applicable, and further processed by a receive processor 1138 to obtain decoded data and control information sent by the UE 120*a*. The receive processor 1138 may provide the decoded data to a data sink 1139 and the decoded control information to the controller/processor 1140.

The controllers/processors 1140 and 1180 may direct the operation at the BS 110*a* and the UE 120*a*, respectively. The memories 1142 and 1182 may store data and program codes for BS 110*a* and UE 120*a*, respectively. A scheduler 1144 may schedule UEs for data transmission on the downlink and/or uplink. As shown in FIG. 11, the controller/processor 1180 of the UE 120*a* has a scheduling manager 1181 that may be configured for receiving scheduling information for a transmission, such as a joint downlink transmission to the 120*a* from TPs in its CoMP cluster and/or an uplink transmission to TPs in its cluster for joint reception, according to aspects described herein. As shown in FIG. 11, the controller/processor 1140 of the BS 110*a* has a scheduling manager 1141 that may be configured for determining a UE conflict graph and/or a cluster graph, in accordance with aspects of the present disclosure. The scheduling manager 1141 may be configured for scheduling UEs based on the UE conflict graph and/or assigning resources to clusters based on the cluster graph, according to aspects described herein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 3 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method by a scheduling device, comprising:
   determining a user equipment (UE) conflict graph including a plurality of vertices and one or more edges between the plurality of vertices, wherein each of the plurality of vertices in the UE conflict graph corresponds to a UE for which there is a transmission, and wherein each of the one or more edges corresponds to two UEs that have a scheduling conflict;
   determining an ordering of UEs in the UE conflict graph, wherein the ordering is based on an associated delay budget of the transmission for the UEs;
   determining a set of resource blocks (RBs) available for scheduling; and
   scheduling one or more of the UEs for transmission based on the UE conflict graph, the ordering, and the set of RBs.

2. The method of claim 1, wherein determining the UE conflict graph includes determining the plurality of vertices by determining UEs for which there is data to be scheduled for at least one of: a downlink joint transmission to the UEs or an uplink transmission from the UEs for joint reception.

3. The method of claim 1, wherein:
   the scheduling device comprises a central entity, and
   scheduling the one or more of the UEs comprises sending scheduling information to at least one of: the one or more of the UEs or one or more transmission points (TPs) serving the one or more of the UEs.

4. The method of claim 1, wherein determining the UE conflict graph comprises:
   determining one or more coordinated multipoint (CoMP) clusters to which a plurality of UEs belong, each of the one or more CoMP clusters including one or more transmission points (TPs), and
   determining UEs of the plurality of UEs that have a scheduling conflict based on at least one of: whether the CoMP clusters to which the UEs belong have at least one common TP or whether the TPs in at least one of the CoMP clusters to which one of the UEs belongs is configured to mute for interference management of one or more of the other UEs.

5. The method of claim 4, further comprising receiving backhaul information from one or more the TPs in the one or more CoMP clusters, wherein the determination of the UE conflict graph is based on the backhaul information.

6. The method of claim 4, wherein the one or more CoMP clusters comprise UE-centric CoMP clusters, each UE-centric CoMP cluster including one or more TPs having a strongest signal quality with respect to the UEs served by the TPs.

7. The method of claim 6, wherein each UE-centric CoMP cluster includes TPs having a signal quality, with respect to the UEs served by the TPs, that is above a threshold, wherein the threshold comprise a first threshold for an initial transmission and a second threshold for a retransmission.

8. The method of claim 7, wherein the second threshold is lower than the first threshold.

9. The method of claim 1, wherein scheduling the one or more of the UEs for transmission based on the UE conflict graph includes scheduling a set of UEs for simultaneous transmission in a same RB only when the set of UEs is an independent set of UEs, the independent set of UEs including only UEs that do not have an edge between them in the UE conflict graph.

10. The method of claim 9, wherein the independent set of UEs is scheduled further only when the set of UEs is not a subset of another independent set of UEs in the UE conflict graph.

11. The method of claim 1, wherein scheduling the one or more of the UEs for transmission based on the UE conflict graph comprises:
   for each of the RBs available for scheduling, maintaining a list of UEs that can be assigned the RB; and
   iteratively performing in descending order:
      determining a modulation and coding scheme (MCS) and a number of RBs for a first UE in the ordering;
      assigning the number of RBs for a first UE from the RBs including the first UE in the list for the RB; and
      for each of the assigned RBs, removing the first UE and all UEs having an edge in the UE conflict graph with the first UE from the list of the UEs that can be assigned the RB.

12. The method of claim 1, wherein scheduling the one or more of the UEs for transmission based on the UE conflict graph comprises:
   determining a maximum independent set (MIS) of UEs by iteratively performing, until no UEs remain in the ordering:
      selecting a next UE in the ordering to schedule for transmission, and
      excluding from the ordering all UEs having an edge in the UE conflict graph with the selected UE; and
   scheduling the MIS of UEs for simultaneous downlink transmission on a same set of RBs by:
      determining a modulation and coding scheme (MCS) and a number of RBs for each of the UEs in the MIS of UEs;
      determining a maximum of the numbers of RBs of the UEs in the MIS of UEs; and
      allocating the determined maximum number of RBs to each of the UEs in the MIS of UEs.

13. The method of claim 12, further comprising:
   excluding the MIS of UEs from the ordering;
   excluding allocated RBs from the available RBs; and
   iteratively performing, until all of the UEs are scheduled:
      determining another one or more MISs of UEs, scheduling the one or more other MISs of UEs,
      excluding the one or more MISs from the ordering, and
      excluding the allocated RBs from the available RBs.

14. The method of claim 12, further comprising updating the MCS for the UEs in the MIS of UEs based on the allocated maximum number of RBs.

15. A method by a central entity, comprising:
   determining a cluster graph including a plurality of vertices and one or more edges between the plurality of vertices, wherein:
      each of the plurality of vertices in the cluster graph correspond to a coordinated multipoint (CoMP) cluster of one or more transmission points (TPs),
      each of the one or more TPs in a CoMP cluster serves one or more user equipment (UE) for which there is a transmission,
      determining the cluster graph includes merging each of one or more CoMP clusters that is a subset of another CoMP cluster with the other CoMP cluster, and
      each of the one or more edges in the cluster graph corresponds to two CoMP clusters that have a scheduling conflict; and
   assigning resources to one or more of the CoMP clusters in the cluster graph based on the cluster graph.

16. The method of claim 15, wherein determining the cluster graph includes determining the plurality of vertices by determining CoMP clusters for which there is data to be scheduled for at least one of: a downlink joint transmission to one or more of the UEs or an uplink transmission from one or more of the UEs for joint reception.

17. The method of claim 15, wherein assigning resources to the one or more of the CoMP clusters in the cluster graph based on the cluster graph comprises assigning orthogonal resources to CoMP clusters in the cluster graph that have an edge between them in the cluster graph.

18. The method of claim 15, wherein determining the cluster graph includes determining CoMP clusters that have a scheduling conflict based on at least one of: whether the CoMP clusters in the cluster graph include at least one common TP or whether at least one of the TPs in the CoMP clusters in the cluster graph is configured to perform muting for interference management of one or more UEs in another CoMP cluster in the cluster graph.

19. The method of claim 15, further comprising receiving backhaul information from one or more of the TPs in the one or more of the CoMP clusters in the cluster graph, wherein the determination of the cluster graph is based on the backhaul information.

20. The method of claim 15, wherein the CoMP clusters in the cluster graph comprise UE-centric CoMP clusters, each UE-centric CoMP cluster including TPs having a signal quality with respect to the UEs served by the TPs that satisfies a threshold.

21. An apparatus, comprising:
   means for determining a user equipment (UE) conflict graph including a plurality of vertices and one or more edges between the plurality of vertices, wherein each of the plurality of vertices in the UE conflict graph corresponds to a UE for which there is a transmission, and wherein each of the one or more edges corresponds to two UEs that have a scheduling conflict;
   means for determining an ordering of UEs in the UE conflict graph, wherein the ordering is based on an associated delay budget of the transmission for the UEs;
   means for determining a set of resource blocks (RBs) available for scheduling; and
   means for scheduling one or more of the UEs for transmission based on the UE conflict graph, the ordering, and the set of RBs.

22. The apparatus of claim 21, wherein scheduling the one or more of the UEs for transmission based on the UE conflict graph comprises:
   for each of the RBs available for scheduling, maintaining a list of UEs that can be assigned the RB; and
   iteratively performing in descending order:
      determining a modulation and coding scheme (MCS) and a number of RBs for a first UE in the ordering;
      assigning the number of RBs for a first UE from the RBs including the first UE in the list for the RB; and
      for each of the assigned RBs, removing the first UE and all UEs having an edge in the UE conflict graph with the first UE from the list of the UEs that can be assigned the RB.

23. The apparatus of claim 21, wherein scheduling the one or more of the UEs for transmission based on the UE conflict graph comprises:
   determining a maximum independent set (MIS) of UEs by iteratively performing, until no UEs remain in the ordering:
      selecting a next UE in the ordering to schedule for transmission, and
      excluding from the ordering all UEs having an edge in the UE conflict graph with the selected UE; and
   scheduling the MIS of UEs for simultaneous downlink transmission on a same set of RBs by:
      determining a modulation and coding scheme (MCS) and a number of RBs for each of the UEs in the MIS of UEs;
      determining a maximum of the numbers of RBs of the UEs in the MIS of UEs; and
      allocating the determined maximum number of RBs to each of the UEs in the MIS of UEs.

24. An apparatus, comprising:
   means for determining a cluster graph including a plurality of vertices and one or more edges between the plurality of vertices, wherein:
      each of the plurality of vertices in the cluster graph correspond to a coordinated multipoint (CoMP) cluster of one or more transmission points (TPs),
      each of the one or more TPs in a CoMP cluster serves one or more user equipment (UE) for which there is a transmission,
      determining the cluster graph includes merging each of one or more CoMP clusters that is a subset of another CoMP cluster with the other CoMP cluster, and
      each of the one or more edges in the cluster graph corresponds to two CoMP clusters that have a scheduling conflict; and
   means for assigning resources to one or more of the CoMP clusters in the cluster graph based on the cluster graph.

25. The apparatus of claim 24, wherein the means for assigning resources to the one or more of the CoMP clusters in the cluster graph based on the cluster graph comprises means for assigning orthogonal resources to CoMP clusters that have an edge between them in the cluster graph.

26. The apparatus of claim 24, wherein the means for determining the cluster graph includes means for determining CoMP clusters in the cluster graph that have a scheduling conflict based on at least one of: whether the CoMP clusters in the cluster graph include at least one common TP or whether at least one of the TPs in the CoMP clusters in the cluster graph is configured to perform muting for interference management of one or more UEs in another CoMP cluster in the cluster graph.

* * * * *